United States Patent
Gracia Grandia

(10) Patent No.: US 8,840,760 B2
(45) Date of Patent: Sep. 23, 2014

(54) METHOD FOR THE CHEMICAL TREATMENT OF STARCH FOR APPLYING IN SHEETS OF PAPER

(75) Inventor: Oriol Gracia Grandia, Viladecans-Barcelona (ES)

(73) Assignee: Oriol Gracia Grandia, Viladecans-Barcelona (ES)

( * ) Notice: Subject to any disclaimer, the term of this patent is extended or adjusted under 35 U.S.C. 154(b) by 39 days.

(21) Appl. No.: 13/380,581

(22) PCT Filed: Oct. 2, 2009

(86) PCT No.: PCT/ES2009/000481
§ 371 (c)(1),
(2), (4) Date: Dec. 23, 2011

(87) PCT Pub. No.: WO2011/039384
PCT Pub. Date: Apr. 7, 2011

(65) Prior Publication Data
US 2012/0101195 A1    Apr. 26, 2012

(51) Int. Cl.
C08L 3/02 (2006.01)
D21H 19/54 (2006.01)
D21H 19/64 (2006.01)
D21H 23/50 (2006.01)

(52) U.S. Cl.
CPC *C08L 3/02* (2013.01); *D21H 19/54* (2013.01); *D21H 23/50* (2013.01); *D21H 19/64* (2013.01)
USPC ............ 162/168.3; 162/158; 162/168.1; 162/168.2; 162/175; 162/181.1; 162/181.3; 106/206.1; 106/214.2; 106/215.1; 106/217.01; 106/217.1; 127/71; 524/52

(58) Field of Classification Search
USPC ........... 162/123, 124, 135, 158, 168.1–168.3, 162/175, 184, 181.1–181.3; 106/162.1, 106/206.1, 214.1, 215.1, 217.1, 217.01; 524/47, 52; 127/2, 9, 23, 67, 69–71
See application file for complete search history.

(56) References Cited

U.S. PATENT DOCUMENTS

| | | | |
|---|---|---|---|
| 3,640,842 A * | 2/1972 | Hullinger et al. | 162/175 |
| 4,239,592 A * | 12/1980 | Gaspar et al. | 162/175 |
| 4,872,951 A * | 10/1989 | Maliczyszyn et al. | 162/135 |
| 5,122,231 A | 6/1992 | Anderson | |
| 5,254,450 A * | 10/1993 | Lacz et al. | 430/538 |
| 5,482,595 A | 1/1996 | Harrington, IV et al. | |
| 6,207,258 B1 * | 3/2001 | Varnell | 428/32.1 |
| 7,682,438 B2 * | 3/2010 | Song et al. | 106/214.1 |
| 8,057,637 B2 * | 11/2011 | Huang et al. | 162/158 |
| 8,383,746 B2 * | 2/2013 | Torii et al. | 526/317.1 |
| 8,460,511 B2 * | 6/2013 | Huang et al. | 162/168.1 |
| 2003/0188738 A1 | 10/2003 | Laleg | |
| 2007/0277950 A1 * | 12/2007 | Skaggs et al. | 162/162 |
| 2009/0320708 A1 * | 12/2009 | Jackson et al. | 101/483 |

FOREIGN PATENT DOCUMENTS

| WO | 99/14432 | 3/1999 |
|---|---|---|
| WO | 00/56775 | 9/2000 |

OTHER PUBLICATIONS

International Search Report issued Feb. 18, 2010 in International (PCT) Application No. PCT/ES2009/000481, of which the present application is the national stage.

* cited by examiner

*Primary Examiner* — Dennis Cordray
(74) *Attorney, Agent, or Firm* — Wenderoth, Lind & Ponack, L.L.P.

(57) ABSTRACT

The object of the process of the invention is to increase the retention of starch in the sheet of paper in order to reduce operating costs and increase the physical characteristics of the paper. To that end, it has been envisaged that trivalent cationic salts are added, metered into the slurry or in the process for obtaining starch in powder form or by mixing a percentage of trivalent salts in powder form with the starch in powder form, seeking the solution of said salts in the slurry, so that they dissolve during the dispersion of the slurry in the process for obtaining the sheet of paper. Organic polymers such as polyacrylamides, polyvinylamides and polydadmacs could optionally be applied in addition to said salts.

5 Claims, No Drawings

METHOD FOR THE CHEMICAL TREATMENT OF STARCH FOR APPLYING IN SHEETS OF PAPER

OBJECT OF THE INVENTION

The present invention relates to a method which has been particularly designed for the chemical treatment of the starch, which starch is intended for being applied by a sprinkler on the sheet of paper.

The object of the invention is to increase the retention of starch in the sheet of paper, as well as to form new ionic bonds between the fibers, in order to reduce operating costs and increase the physical characteristics of the paper.

BACKGROUND OF THE INVENTION

In the practical scope of application of the invention, what is sought is to demonstrate the efficiency of the process in the flocculation of the starch slurry, which has been a long-sought objective that has been unsuccessful until now in an effective and continuous manner. This is demonstrated by the lack of implementation on the market. Many tests have been conducted, but either because the nozzles in the sprinkler become plugged or due to a lack of efficiency in the result, among other reasons, the results and treatments have been discarded.

The products used until now have consisted of cationic polyacrylamides, polyamides, polydadmac, polyethylenimines, polyimines, polyvinylamines and mixtures thereof, as well as anionic polyacrylamides, without obtaining any positive result.

DESCRIPTION OF THE INVENTION

The method for the chemical treatment of starch proposed by the invention solves in a fully satisfactory manner the aforementioned drawbacks, which allows obtaining a retention of the starch in the sheet of paper ranging between 20 and 50%, depending on the porosity of the sheet, as well as of the suction strength of the suction boxes.

To that end and more specifically, the method consists of using trivalent and/or bivalent inorganic cationic salts and, optionally, cationic organic polymers, which are metered onto any type of starch, which is applied superficially in a slurry by means of spraying it on the sheet of paper for the purpose of joining the different layers of paper to one another and/or increasing the physical characteristics of the sheet.

The described method will be carried out by means of stirring at room temperature in aqueous phase, and it can be indistinctly metered into the slurry or incorporated in the starch itself in powder form from the production factory of the same with the trivalent inorganic salts in solid form.

By means of said application, particles of different sizes are clustered together, unifying and increasing the starch particle size, thus achieving greater retention of the starch on the sheet and in turn creating strong chemical bonds between the fibers.

The organic polymers used could be polyacrylamides, polyvinylamides, polydadmacs and polyamines.

PRACTICAL EMBODIMENT OF THE INVENTION

As mentioned above, the product to be applied in the slurry or in the starch itself in the process for obtaining the sheet of paper can be formed entirely by trivalent salts, or it can furthermore comprise a mixture of polydadmacs, polyacrylamides and polyvinylamide, all these components being able to be present at proportions comprised between 0.1 and 50% of the total weight of the mixture.

This composition reacts with the native starch pooling together different starch particles, regardless of the size of each of them, as well as it also reacts with the cellulosic fiber increasing the bonds between them and forming stronger bonds.

Due to the ionic nature of the trivalent inorganic cationic salts and their molecular arrangement, said salts have affinity for the particles of any type of starch, reacting with the native starch which is slightly anionic. Said reaction achieves joining together the necessary amount of particles to compensate for the cationic charge of the trivalent ion of the corresponding salt. A set of particles is thus obtained which behaves similarly to a single particle of a size that is up to 4 times greater.

Due to the fact that in one and the same starch sample there are particles with different sizes, it is observed that the trivalent salts are more reactive the smaller the starch particles due to their charge distribution and their specific surface, which causes a greater joining of the smaller particles of the distribution curve, whereas the size of the larger particles is hardly modified since they are less reactive. This phenomenon causes a modification in the particle distribution curve, making the curve more restricted, i.e., increasing the amount of larger particles, and generally increasing the size.

Increasing the starch particle size helps the starch, which is in a state of suspension with water, whether it is from the supply system or from the production system itself, once superficially applied partly or completely on the sheet of paper already formed, to remain in a larger amount, increasing its performance and therefore increasing the joining between several layers of paper, the physico-mechanical characteristics of the sheet, and reducing the amount of free starch in the process water. The treatment reduces starch consumption as well as the contaminants supplied in the process and waste water.

By way of example, a proportion of between 0.05% and 10% of $Al_2(SO_4)_3$, $AlCl_3$ or similar salts already described can be used on dry starch so that the trivalent ions, after dissociation from the inorganic salt, react with the starch particles, pooling several of them together. These salts have a higher tendency for these starch particles of a smaller size. According to the type of starch, these two salts are used alone or combined with one another and offer good results.

According to the type of starches, the need to use trivalent salts which act similarly but with some differences which aid, in combination, the aforementioned salts, is clear. These salts are $FeCl_3$, $Fe_2(SO_4)_3$, and they are used in doses ranging from 0.05% and 10% on dry starch. These salts have greater affinity for these starch particles of mid-large size, which aids in proportionally increasing the general treated starch particle size.

Even though the sheet is already formed, due to the fact that it still has a minimum moisture content of 70%, the fibers forming it are at their optimal point for creating bonds between them, the organic and inorganic agents and the OH developed by the temperature of the dryers, which are in charge of cooking the polysaccharide.

Therefore, since under normal conditions the fibers also begin to form hydrogen bridge bonds between one another, upon contacting the cationic organic polymers an ionic charge attraction reaction occurs between the cationic polymer and the anionic fibers, forming much stronger ionic bonds than the bonds formed naturally from a hydrogen bridge. This phenomenon provides greater physical characteristics to the sheet of paper.

A composition of different cationic organic polymers which maintains charge balance, as well as the manner of acting of each of them with the fibers, has been sought in this invention.

First, a cationic polyacrylamide with medium-low molecular weight is used in a dose range between 0.1% and 20% on dry starch. This polyacrylamide is used to slightly increase the set of starch particles previously reacted with the different trivalent salts, and in turn leaving free cationic radicals which react with the cellulosic fiber once the starch is applied on the surface or in the mass.

Organic polymers, such as polyamines, polyvinylamides and polydadmacs, are also present in the composition, all having an application range between 0.1% and 30% on dry starch. These three families of polymers are in charge of reacting with the cellulosic fibers for the purpose of forming stronger ionic bonds than that of the hydrogen bridge, as well as to increase the amount of cross-linked fibers, in the event that the starch is applied in the mass or on the surface and at a point in which there is still a possibility of a loss of fibers with the washing or drainage water.

According to the foregoing, the process of obtaining a sheet of paper with the addition of the product proposed for carrying out laboratory tests would be the following:

The paper pulp solution is prepared. The usual concentration of preparation is at 20 g/L of pulp. To that end, the amount of pulp necessary is weighed, cut into smaller pieces and diluted to the desired volume with water. Both components are introduced in the beater and are beat for 15 minutes. This pulp solution is subsequently diluted to 10 g/L (if no pulp concentration is specified).

The volume of pulp necessary for obtaining a sheet of the desired weight is taken with a measuring cylinder and it is transferred to wide 1 L measuring cylinders. It is transferred from measuring cylinder to measuring cylinder 8 to 10 times.

The sheet is subsequently formed in the sheet forming apparatus. To that end, the sheet forming apparatus is filled with water up to a certain height (which is always the same for all the sheets) and the pulp solution is added. It is stirred to homogenize the pulp and the water is drained out of the sheet forming apparatus. A vacuum is applied until no water is extracted.

The sheet forming apparatus is sprayed with the volume of the solution to be evaluated and a vacuum is again applied. The sheet is subsequently extracted with blotting paper.

Once the sheet is formed, an aluminum plate is placed thereon, it is placed between two felts and is pressed, always exerting the same force. Once pressed, the sheet is placed in the oven to dry it at 105° C. for 15 minutes. After this time, the sheet is taken out of the oven and left to cool. The sheet is now prepared to perform the suitable tests.

The invention claimed is:

1. A method for the chemical treatment of starch for its application on sheets of paper, characterized by comprising the following steps:
   mixing the starch with an additive comprising between 0.1% and 50% of trivalent cationic salts,
   wherein the trivalent cationic salts comprise between 0.05% and 10% of $FeCl_3$ or $Fe_2(SO_4)_3$; and
   spraying on the sheet of paper a slurry containing the starch and the additive.

2. The method according to claim 1, wherein the additive further comprises between 0.1% and 50% of organic polymers.

3. The method according to claim 1, wherein the organic polymers comprise polyacrylamide, polyvinylamide, polyamine and/or polydadmac.

4. The method according to claim 3, where the organic polymers comprise between 0.5% and 20% of polyacrylamide.

5. The method according to claim 3, where the organic polymers comprise between 0.1% and 30% of polyvinylamide, polydadmac and/or polyamine.

* * * * *